(12) United States Patent
Lim et al.

(10) Patent No.: US 10,075,545 B2
(45) Date of Patent: Sep. 11, 2018

(54) APPARATUS AND METHOD FOR MANAGING ZONE PRESENCE

(71) Applicant: Electronics and Telecommunications Research Institute, Daejeon (KR)

(72) Inventors: Sun Hwan Lim, Daejeon (KR); Chang Sup Keum, Daejeon (KR); Hyun Kyung Yoo, Daejeon (KR); Jong Choul Yim, Daejeon (KR); Ki Sook Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 169 days.

(21) Appl. No.: 15/097,503

(22) Filed: Apr. 13, 2016

(65) Prior Publication Data

US 2016/0308989 A1    Oct. 20, 2016

(30) Foreign Application Priority Data

| Apr. 14, 2015 | (KR) | 10-2015-0052745 |
|---|---|---|
| Jul. 6, 2015 | (KR) | 10-2015-0095970 |
| Mar. 25, 2016 | (KR) | 10-2016-0036292 |

(51) Int. Cl.
*H04L 12/741* (2013.01)
*H04L 29/08* (2006.01)
*H04W 4/00* (2018.01)
*H04W 4/60* (2018.01)
*H04W 88/08* (2009.01)
*H04W 84/12* (2009.01)

(52) U.S. Cl.
CPC .......... *H04L 67/22* (2013.01); *H04L 45/745* (2013.01); *H04W 4/60* (2018.02); *H04W 84/12* (2013.01); *H04W 88/08* (2013.01)

(58) Field of Classification Search
CPC ...... H04L 45/745; H04L 67/22; H04W 4/003; H04W 84/12; H04W 88/08
See application file for complete search history.

(56) References Cited

U.S. PATENT DOCUMENTS

| 8,656,417 B2 * | 2/2014 | May | H04L 12/6418 |
|---|---|---|---|
| | | | 719/328 |
| 8,670,752 B2 * | 3/2014 | Fan | G07C 9/00309 |
| | | | 380/247 |

(Continued)

FOREIGN PATENT DOCUMENTS

KR    1020090054283 A    5/2009

OTHER PUBLICATIONS

"Small Cell Zone services," Small Cell Forum, Dec. 2013, pp. 1-31.

*Primary Examiner* — Alpus H Hsu
(74) *Attorney, Agent, or Firm* — William Park & Associates Ltd.

(57) ABSTRACT

Provided is an apparatus for managing zone presence, which manages presence information of a zone including a plurality of wireless access points, including: a presence managing unit receiving a subscription request from an application server and determining whether user terminal access information received from at least any one among the plurality of wireless access points corresponds to the subscription request; and an API processing unit providing the presence information to the application server when the user terminal access information corresponds to the subscription request.

15 Claims, 14 Drawing Sheets

(56) References Cited

U.S. PATENT DOCUMENTS

| | | | |
|---|---|---|---|
| 8,792,419 B2* | 7/2014 | Wohlert | H04W 4/04 |
| | | | 370/328 |
| 8,798,613 B2* | 8/2014 | MacNaughtan | G06Q 30/0241 |
| | | | 455/422.1 |
| 9,014,663 B2* | 4/2015 | Saker | H04L 12/1407 |
| | | | 455/406 |
| 9,271,113 B2* | 2/2016 | MacPherson | H04W 4/02 |
| 9,432,908 B2* | 8/2016 | Wohlert | H04W 4/04 |
| 9,510,234 B2* | 11/2016 | Kim | H04W 28/0289 |
| 9,532,238 B2* | 12/2016 | Lv | H04W 24/02 |
| 9,667,495 B2* | 5/2017 | Van Der Merwe | |
| | | | H04L 41/5051 |
| 9,801,233 B2* | 10/2017 | Laha | H04W 84/10 |
| 2007/0077922 A1 | 4/2007 | Kim et al. | |
| 2007/0126581 A1 | 6/2007 | Sung et al. | |
| 2008/0070550 A1* | 3/2008 | Hose | H04L 63/10 |
| | | | 455/411 |
| 2011/0191425 A1* | 8/2011 | Brodeur | G06F 15/16 |
| | | | 709/206 |
| 2015/0007199 A1* | 1/2015 | Valeva | G06F 9/546 |
| | | | 719/313 |

* cited by examiner

FIG.9

| ownerId | name | password | contact | description |
|---|---|---|---|---|
| zowner00001 | kim | passxx | 02-111-1111 | ... |
| zowner00002 | lim | passyy | 02-222-2222 | ... |
| ... | ... | ... | ... | ... |

FIG.10

| subscriptionId | ownerId | zoneId | interestRealms | userEventCriteria | callbackAddress |
|---|---|---|---|---|---|
| sub123 | zowner00001 | zone001 | gangnam | zoneEnter, zoneExit | ... |
| ... | ... | ... | ... | ... | ... |

FIG. 11

| subscriptionId | ownerId | userId | userEventCriteria | callbackAddress |
|---|---|---|---|---|
| sub123 | zowner00001 | 01011112222 | zoneEnter, zoneExit | ... |
| ... | ... | ... | ... | ... |

FIG. 12

| subscriptionId | ownerId | zoneId | noOfZoneUsers | noOfAPUsers | operationStatus | callbackAddress |
|---|---|---|---|---|---|---|
| sub123 | zowner00001 | zone001 | 100 | 10 | serviceable | ... |
| ... | ... | ... | ... | ... | ... | ... |

FIG. 13

| zoneId | apId | apStatus | noOfUsers | location | connType | timezone | interestRealms |
|---|---|---|---|---|---|---|---|
| zone001 | ap01 | serviceable | 10 | (3,3,1,1) | femto | GMT+9 | gangnam |
| zone001 | ap02 | unserviceable | 0 | (4,4,2,2) | wifi | GMT+9 | gangnam |
| ... | ... | ... | ... | ... | ... | ... | ... |

FIG. 14

| zoneId | apId | userId | connectionTime | releaseTime |
|---|---|---|---|---|
| zone0001 | ap01 | 01011112222 | 12345678 | 12500000 |
| ... | ... | ... | ... | ... |

APPARATUS AND METHOD FOR MANAGING ZONE PRESENCE

CROSS-REFERENCE TO RELATED APPLICATIONS

This application claims priority to and the benefit of Korean Patent Application No. 10-2015-0052745 filed in the Korean Intellectual Property Office on Apr. 14, 2015, No. 10-2015-0095970 filed in the Korean Intellectual Property Office on Jul. 6, 2015, and No. 10-2016-0036292 filed in the Korean Intellectual Property Office on Mar. 25, 2016, the entire contents of which are incorporated herein by reference.

TECHNICAL FIELD

The present invention relates to an apparatus and a method for managing zone presence.

BACKGROUND ART

A communication network abstraction technology that provides a function of a mobile communication network as an open API and makes various applications by using the provided API has been continuously developed. Since standardization is important in the case of the open API, various types of open APIs have been developed based on Open Mobile Alliance (OMA) which is a global leading group in the technical field.

In recent years, in a small cell forum constituted by a mobile communication company and a communication equipment manufacturer, wireless access points including WiFi Access Point, Home eNodeB, and the like wirelessly accessed by a user terminal are bound as a group and thereafter, the group is defined as a zone to define a Zonal Presence API which is an API sensing an event which occurs in a specific zone by sensing that a user accesses the wireless access point or releases the access.

However, the current Zonal Presence API can just provide a function to sense events in which a arbitrary user enters the zone (zone enter), the user exits from the zone (zone exit), and the user is transferred from the inside of the zone to another place (zone transfer), and as a result, providing a more detailed and additional function is actually required.

SUMMARY OF THE INVENTION

The present invention has been made in an effort to provide an apparatus and a method for managing zone presence which can provide detailed and additional information such as access information of a user terminal accessing an interested area, access information of the specific user terminal accessing any wireless access point in a zone, and event information occurring in the wireless access point in the zone to an application server according to a subscription request.

The technical objects of the present invention are not limited to the aforementioned technical objects, and other technical objects, which are not mentioned above, will be apparently appreciated to a person having ordinary skill in the art from the following description.

An exemplary embodiment of the present invention provides an apparatus for managing zone presence, which manages presence information of a zone including a plurality of wireless access points, including: a presence managing unit receiving a subscription request from an application server and determining whether user terminal access information received from at least any one among the plurality of wireless access points corresponds to the subscription request; and an API processing unit providing the presence information to the application server when the user terminal access information corresponds to the subscription request.

The subscription request may be a request for access information of a user terminal which accesses the wireless access point included in an interested area defined as a specific area in the zone.

The subscription request may be a request for access information of a user terminal of a specific user to the plurality of wireless access points.

The subscription request may be a request for information on a specific event which occurs in at least any one of the plurality of wireless access points.

The subscription request may include at least any one of interested area information, interested user information, and interested event information.

The presence managing unit may record at least any one of the interested area information, the interested user information, and the interested event information in a zone presence information database and determine whether the user terminal access information corresponds to the subscription request by using the zone presence information database.

The zone presence information database may include at least any one of a zone owner information table, a zone subscription information table, a user subscription information table, a zone status information table, a zone configuration information table, and a zone event information table.

The user subscription information table may include the interested user information.

The zone status information table may include the interested event information, and the interested event information may include a maximum threshold of the number of user terminals that access the plurality of wireless access points included in the zone.

The zone configuration information table may include the interested area information, and the interested area information may be defined as information on a specific area in the zone.

The zone event information table may include at least any one of zone identification information, access start time information, access end time information, AP identification information, and terminal identification information.

The API processing unit may provide the presence information to the application server by using a RESTful type zone presence API.

The apparatus may further include a communication unit receiving the user terminal access information from at least any one of the plurality of wireless access points; and a storage unit storing information included in the subscription request.

Another exemplary embodiment of the present invention provides a method for managing zone presence, which manages presence information of a zone including a plurality of wireless access points, including: receiving a subscription request from an application server; determining whether user terminal access information received from at least any one of the plurality of wireless access points corresponds to the subscription request; and providing the presence information to the application server when the user terminal access information corresponds to the subscription request.

The subscription request may be a request for access information of a user terminal which accesses the wireless access point included in an interested area defined as a specific area in the zone.

The subscription request may be a request for access information of a user terminal of a specific user to the plurality of wireless access points.

The subscription request may be a request for information on a specific event which occurs in at least any one of the plurality of wireless access points.

The subscription request may include at least any one of interested area information, interested user information, and interested event information.

According to exemplary embodiments of the present invention, an apparatus and a method for managing zone presence can provide detailed and additional information such as access information of a user terminal accessing an interested area, access information of the specific user terminal accessing any wireless access point in a zone, and event information occurring in the wireless access point in the zone to an application server according to a subscription request.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

BRIEF DESCRIPTION OF THE DRAWINGS

FIGS. 9 to 14 are diagrams for describing a subscription request according to the exemplary embodiment of the present invention.

Figure 1:
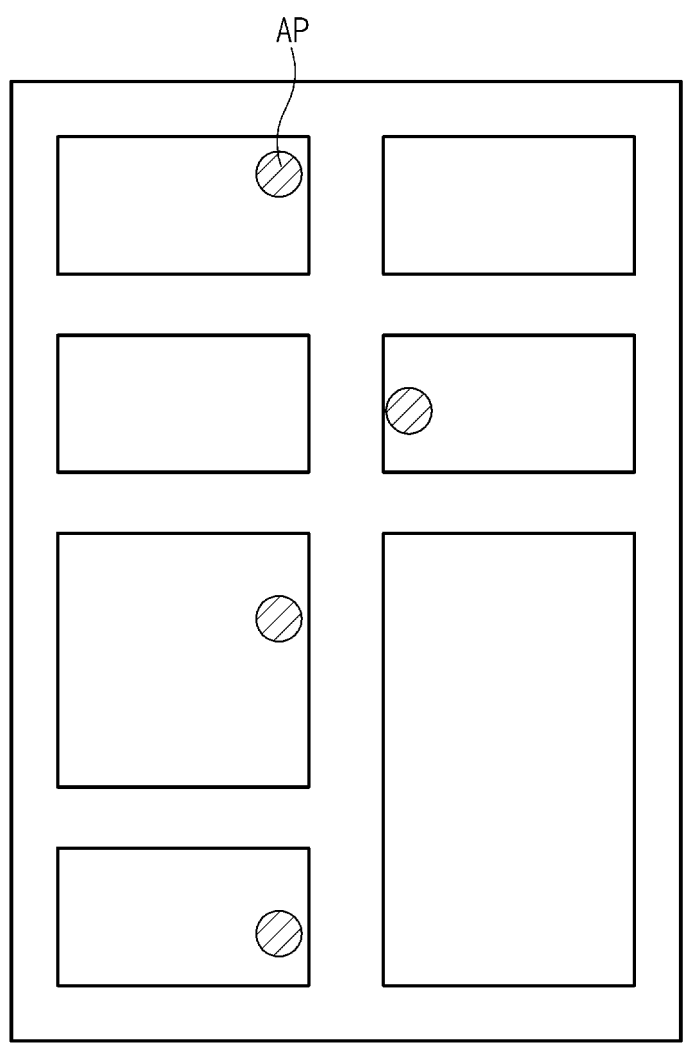
FIGS. 1 and 2 are diagrams illustrating a zone according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the exemplary drawings. When reference numerals refer to components of each drawing, it is noted that although the same components are illustrated in different drawings, the same components are designated by the same reference numerals as possible. In describing the exemplary embodiments of the present invention, when it is determined that the detailed description of the known components and functions related to the present invention may obscure understanding of the exemplary embodiments of the present invention, the detailed description thereof will be omitted.

Terms such as first, second, A, B, (a), (b), and the like may be used in describing the components of the exemplary embodiments of the present invention. The terms are only used to distinguish a component from another component, but nature or an order of the component is not limited by the terms. Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Figure 2:
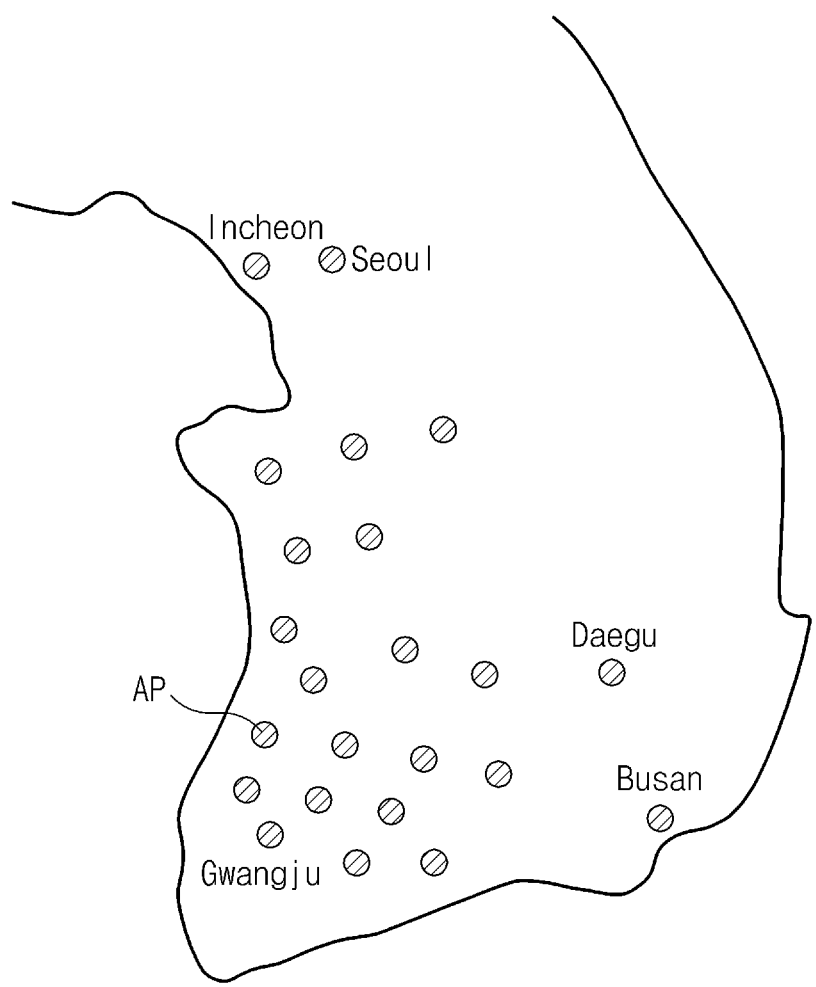

FIGS. 1 and 2 are diagrams illustrating a zone according to an exemplary embodiment of the present invention.

Referring to FIGS. 1 and 2, the zone may be defined as a specific area including a plurality of wireless access points AP.

For example, the zone may be defined as a geographically adjacent area depending on a geographical location and defined regardless of the geographical location based on ownership and the like, and further, various definitions of the zone, which include a definition by a combination thereof may be given. Further, the zone may be defined as a small area (e.g., the inside of a specific building) including a very small number of wireless access points, and also defined as a large area (e.g., a specific area of the territory of Korea) including a very large number of wireless access points.

Figure 3:
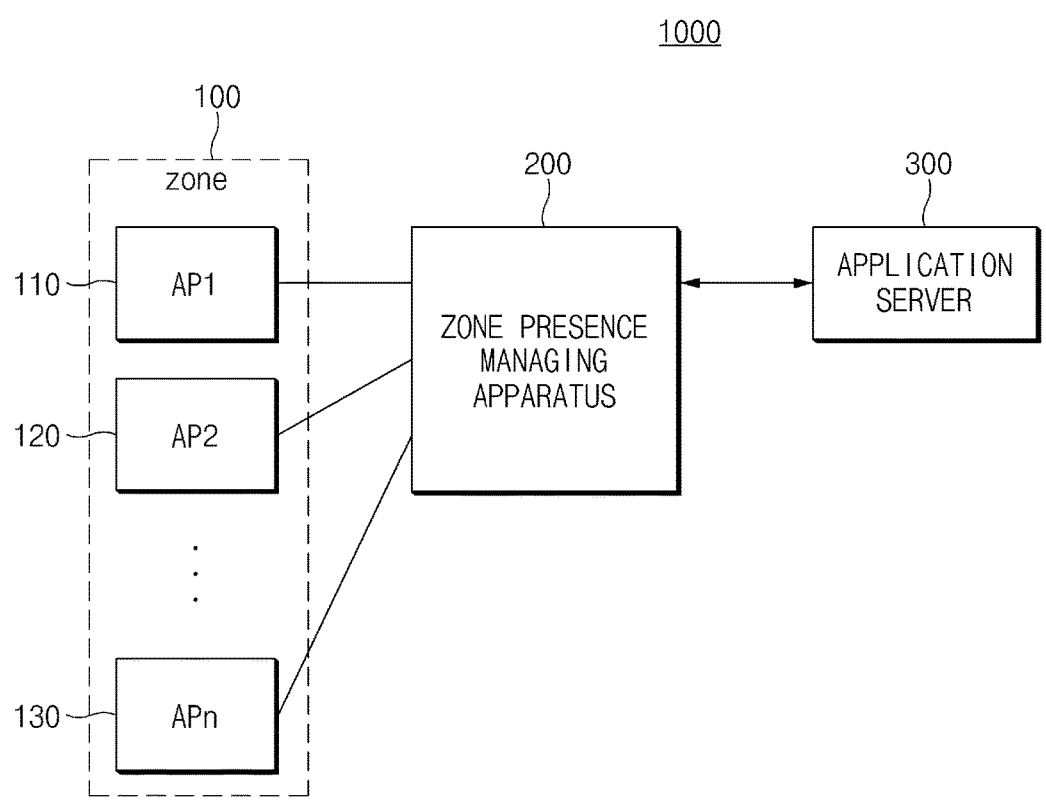
FIG. 3 illustrates a system for managing zone presence according to an exemplary embodiment of the present invention.

FIG. 3 illustrates a system for managing zone presence according to an exemplary embodiment of the present invention.

Referring to FIG. 3, a system 1000 for managing zone presence according to an exemplary embodiment of the present invention may include a plurality of wireless access points 110, 120, . . . , 130 disposed in a zone 100, a zone presence managing apparatus 200, and an application server 300.

Each of the plurality of wireless access points 110, 120, . . . , 130 may detect access to the user terminal. Each of the plurality of wireless access points 110, 120, . . . , 130 may transfer user terminal access information to the zone presence managing apparatus 200 when the user terminal is accessed. In FIG. 3, the plurality of wireless access points are illustrated as APs, but are not limited thereto, and may include various wireless access points such as Home eNodeB or WiFi AP.

The zone presence managing apparatus 200 may receive a subscription request from the application server 300. For example, the subscription request may include at least one of interested area information, interested user information, and interested event information, but is not limited thereto. For example, the subscription request may include at least one of the interested area information, the interested user information, and the interested event information according to a function/service to be provided by the application. Herein, the interested area information may mean information on an interested area defined as a specific area in the zone. Meanwhile, the application server 300 may transfer an API call request based on an API resource received from the application to the zone presence managing apparatus 200. The zone presence managing apparatus 200 acquires presence information corresponding to the API call request to provide the acquired presence information to the application server 300 in an open API form. In this aspect, the API call request may mean the subscription request.

The zone presence managing apparatus 200 may record the interested area information, the interested user information, and the interested event information included in the subscription request in a zone presence information database.

The zone presence managing apparatus 200 may receive the user terminal access information from at least one of the plurality of wireless access points. The zone presence managing apparatus 200 may determine whether the received user terminal access information corresponds to the received subscription request from the application server 300. For example, the zone presence managing apparatus 200 may determine whether the user terminal access information corresponds to the subscription request by using the zone presence information database.

The zone presence managing apparatus 200 may provide the presence information to the application server 300 when the user terminal access information corresponds to the subscription request. For example, when the subscription request is a request for the access information of the user terminal which accesses the wireless access point included in the interested area defined by the specific area in the zone (that is, including the interested area information) and the user terminal access information is information transmitted from the wireless access point included in the interested area, the zone presence managing apparatus 200 may provide the access fact of the user terminal to the application server 300 as the presence information.

The application server 300 may perform a function of generating and executing a service so as to develop and operate the application by using an open application programming interface (API). The application server 300 may transfer the API call request based on the API resource received from the application to the zone presence managing apparatus 200. The applications may receive various information from the zone presence managing apparatus 200 through the application server 300 in the open API form and provide an appropriate additional function/additional service to the user by using various information.

Hereinafter, the zone presence managing apparatus 200 according to the exemplary embodiment of the present invention will be described in more detail.

Figure 4:
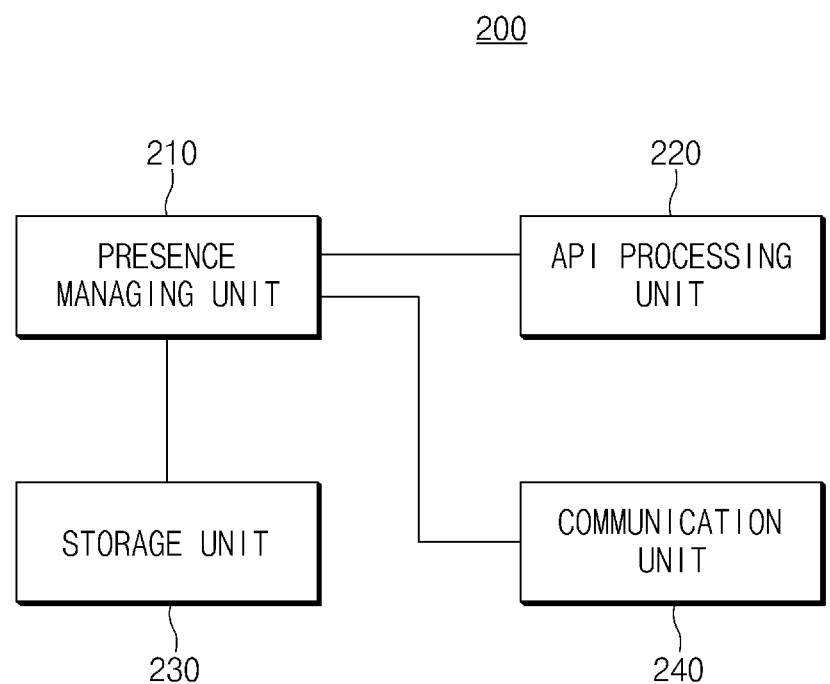
FIG. 4 is a block diagram illustrating an apparatus for managing zone presence according to another exemplary embodiment of the present invention.

FIG. 4 is a block diagram illustrating an apparatus for managing zone presence according to another exemplary embodiment of the present invention.

First, referring to FIG. 4, the apparatus 200 for managing zone presence according to another exemplary embodiment of the present invention may include a presence managing unit 210, an API processing unit 220, a storage unit 230, and a communication unit 240.

The presence managing unit 210 may receive a subscription request from the application server 300. The subscription request may be transferred to the presence managing unit 210 through the API processing unit 220. The subscription request may include at least one of interested area information, interested user information, and interested event information, but is not limited thereto. The subscription request may include at least one of the interested area information, the interested user information, and the interested event information according to a function/service to be provided by the application. Herein, the interested area information may mean information on an interested area defined as a specific area in the zone.

For example, the subscription request may be any one of a request for the access information of the user terminal which accesses a wireless access point included in the interested area defined by the specific area in the zone, a request for the user terminal access information of a specific user for a plurality of wireless access points, and a request for specific event information occurring in at least one of the plurality of wireless access points. However, the subscription request is not limited to the aforementioned requests.

The presence managing unit 210 may record the interested area information, the interested user information, and the interested event information included in the subscription request in a zone presence information database.

The presence managing unit 210 may receive the user terminal access information from at least one of the plurality of wireless access points. The presence managing unit 210 may determine whether the received user terminal access information corresponds to the subscription request received from the application server 300. For example, the presence managing unit 210 may determine whether the user terminal access information corresponds to the subscription request by using the zone presence information database. The presence managing unit 210 may transmit the user terminal access information to the API processing unit 220, when the user terminal access information corresponds to the subscription request.

The API processing unit 220 may provide the presence information to the application server 300 when the user terminal access information corresponds to the subscription request. Herein, the presence information may be the user terminal access information or information having a processed form of the user terminal access information. For example, when the subscription request is a request for the access information of the user terminal which accesses the wireless access point included in the interested area defined by the specific area in the zone (that is, including the interested area information) and the user terminal access information is information transmitted from the wireless access point included in the interested area, the API processing unit 220 may provide the access fact of the user terminal to the application server 300 as the presence information.

The API processing unit 220 may provide the presence information to the application server in an open API form. Herein, REST may mean a framework transferring data to an HTTP protocol without adding an additional layer or session management.

REST is settled in a web application to easily use remotely or locally resources opened in the web, and a service and an application to be defined and used according to a REST architecture style is called a RESTful web service. Herein, the resources mean all opened resources to be shared with other users in the web, such as a web site, a blog, an image, music, a user, a map, and a search result, as core elements of the REST architecture. The resources in the REST structure have unique URLs thereof, and may be accessed by only GET/PUT/POST/DELETE as a basic method of HTTP.

The RESTful web service is called a resource-based architecture (ROA) due to characteristics of expression, transfer, and access methods based on the resources. The ROA is referred to as a concept corresponding to an SOA based on the service. That is, the RESTful web service may be an accessible service to only a HTTP protocol regardless of the kinds of web server and web client when the resource URL is known.

The storage unit 230 may store the zone presence information database.

The communication unit 240 may receive the user terminal access information from at least one of the plurality of wireless access points. The communication unit 240 may transfer the received user terminal access information to the presence managing unit 210.

As described above, the apparatus 200 for managing the zone presence according to another exemplary embodiment of the present invention may provide the user terminal access information corresponding to the subscription request transferred from the application server 300 to the application server 300. In detail, the apparatus 200 for managing the zone presence may provide detailed and additional information such as access information of the user terminal accessing the interested area, access information of the specific user terminal accessing any wireless access point in the zone, and event information occurring in the wireless access point in the zone to the application server 300 according to the subscription request.

Figure 5:
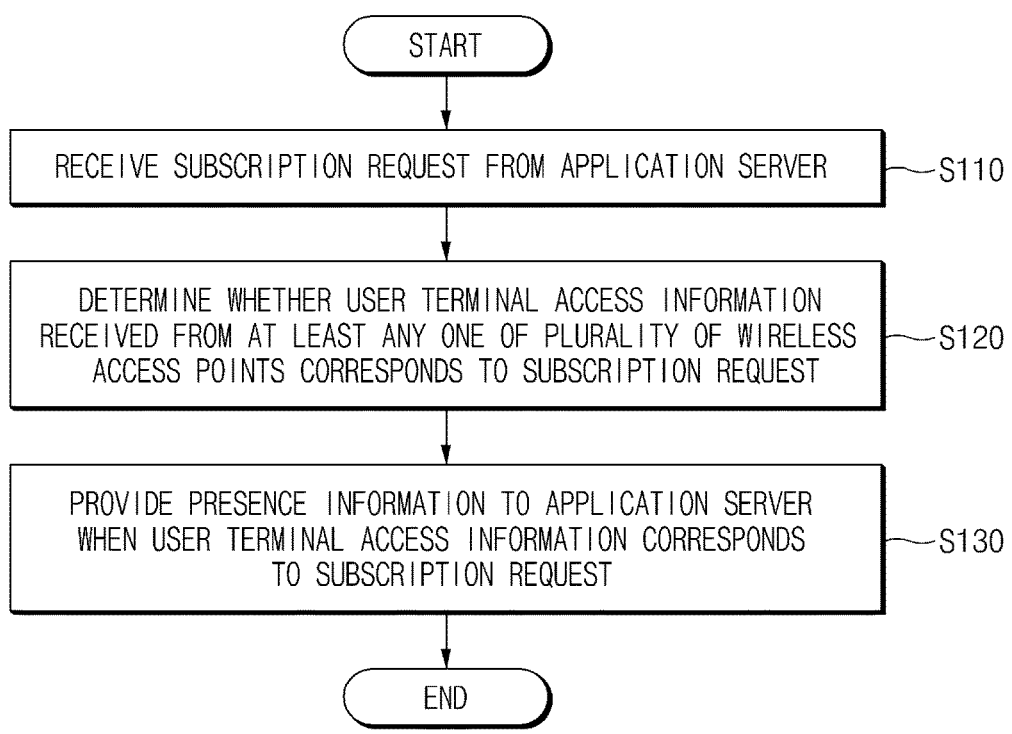
FIG. 5 is a flowchart illustrating a method for managing zone presence according to an exemplary embodiment of the present invention.

FIG. 5 is a flowchart illustrating a method for managing zone presence according to an exemplary embodiment of the present invention.

Referring to FIG. 5, the method for managing zone presence according to the exemplary embodiment of the present invention may include receiving a subscription request from an application server (S110), determining whether user terminal access information received from at least one of a plurality of wireless access points corresponds to the subscription (S120), and providing presence information to the application server when the user terminal access information corresponds to the subscription request (S130).

Hereinafter, the steps S110 to S130 described above will be described in more detail with reference to FIG. 4.

In step S110, an API processing unit 220 receives a subscription request from the application server 300 and may transmit the received subscription request to a presence managing unit 210.

The presence managing unit 210 may receive the subscription request. The subscription request may include at least one of interested area information, interested user information, and interested event information, but is not limited thereto. The subscription request may include at least one of the interested area information, the interested user information, and the interested event information according to a function/service to be provided by the application. Herein, the interested area information may mean information on an interested area defined by a specific area in the zone.

For example, the subscription request may be any one of a request for the access information of the user terminal which accesses a wireless access point included in the interested area defined by the specific area in the zone, a request for the user terminal access information of a specific user for a plurality of wireless access points, and a request for specific event information occurring in at least one of the plurality of wireless access points. However, the subscription request is not limited to the aforementioned requests.

The presence managing unit 210 may record the interested area information, the interested user information, and the interested event information included in the subscription request in a zone presence information database.

In step S120, the presence managing unit 210 receives the user terminal access information from at least one of the plurality of wireless access points, and may determine whether the received user terminal access information corresponds to the subscription request received from the application server 300. For example, the presence managing unit 210 may determine whether the user terminal access information corresponds to the subscription request by using the zone presence information database. The presence managing unit 210 may transmit the user terminal access information to the API processing unit 220, when the user terminal access information corresponds to the subscription request.

In step S130, the API processing unit 220 may provide the presence information to the application server 300 when the user terminal access information corresponds to the subscription request. Herein, the presence information may be the user terminal access information or information having a processed form of the user terminal access information. For example, when the subscription request is a request for the access information of the user terminal which accesses the wireless access point included in the interested area defined by the specific area in the zone (that is, including the interested area information) and the user terminal access information is information transmitted from the wireless access point included in the interested area, the API processing unit 220 may provide the access fact of the user terminal to the application server 300 as the presence information. The API processing unit 220 may provide the presence information to the application server in an open API form. Herein, REST may mean a framework transferring data to an HTTP protocol without adding an additional layer or session management.

Figure 6:
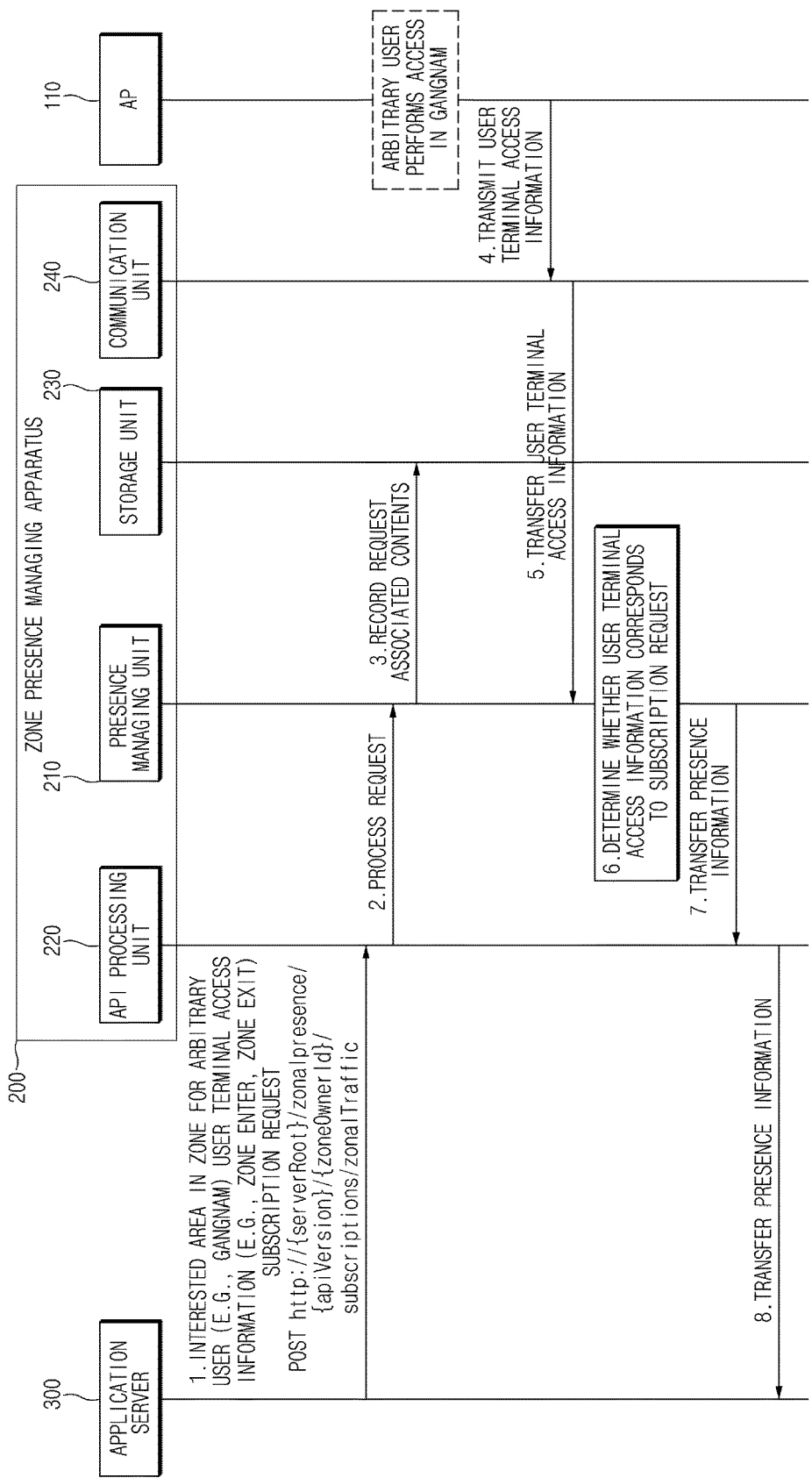
FIGS. 6 to 8 illustrate the method for managing the zone presence according to the exemplary embodiment of the present invention in more detail.
Figure 7:
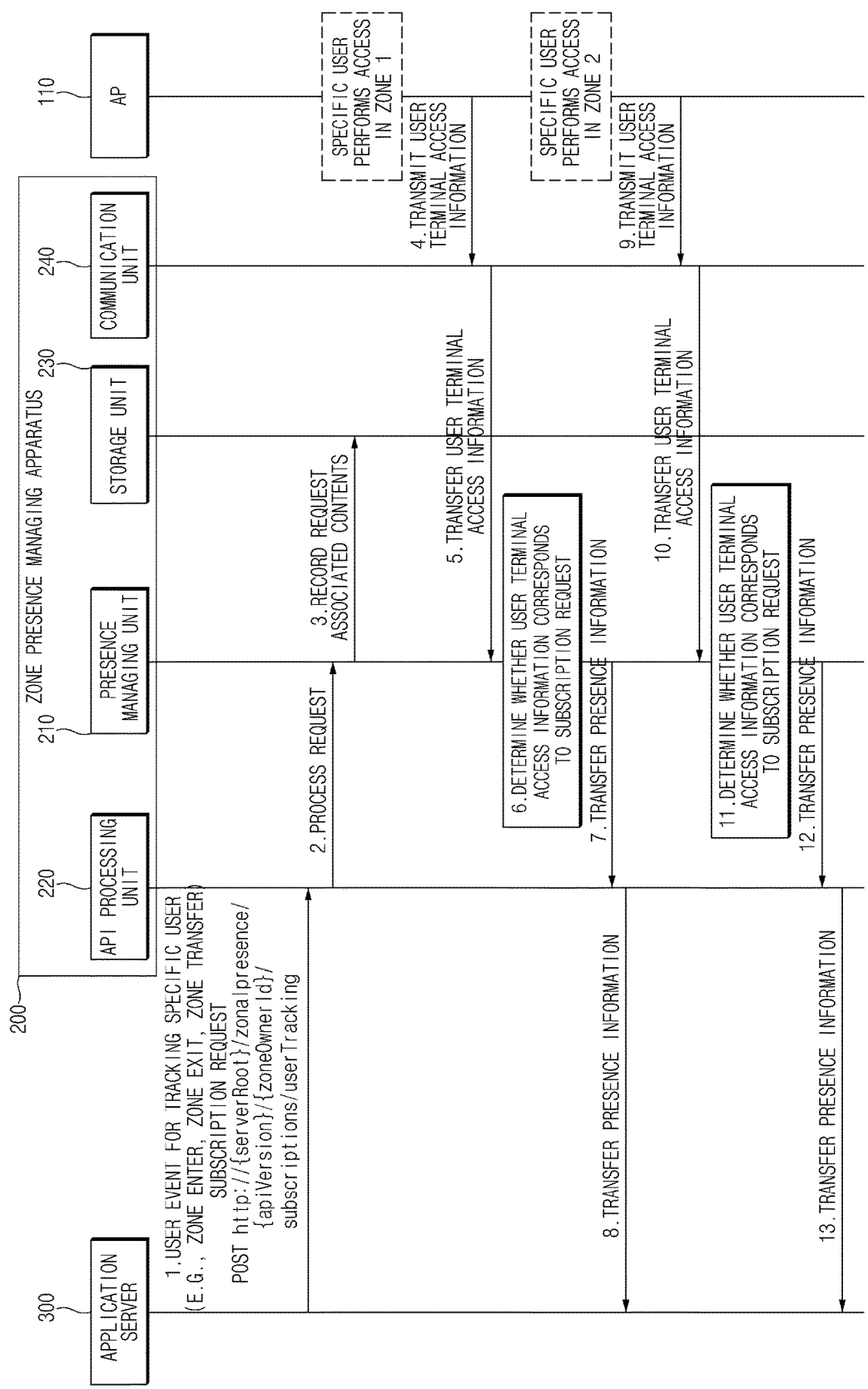
Figure 8:
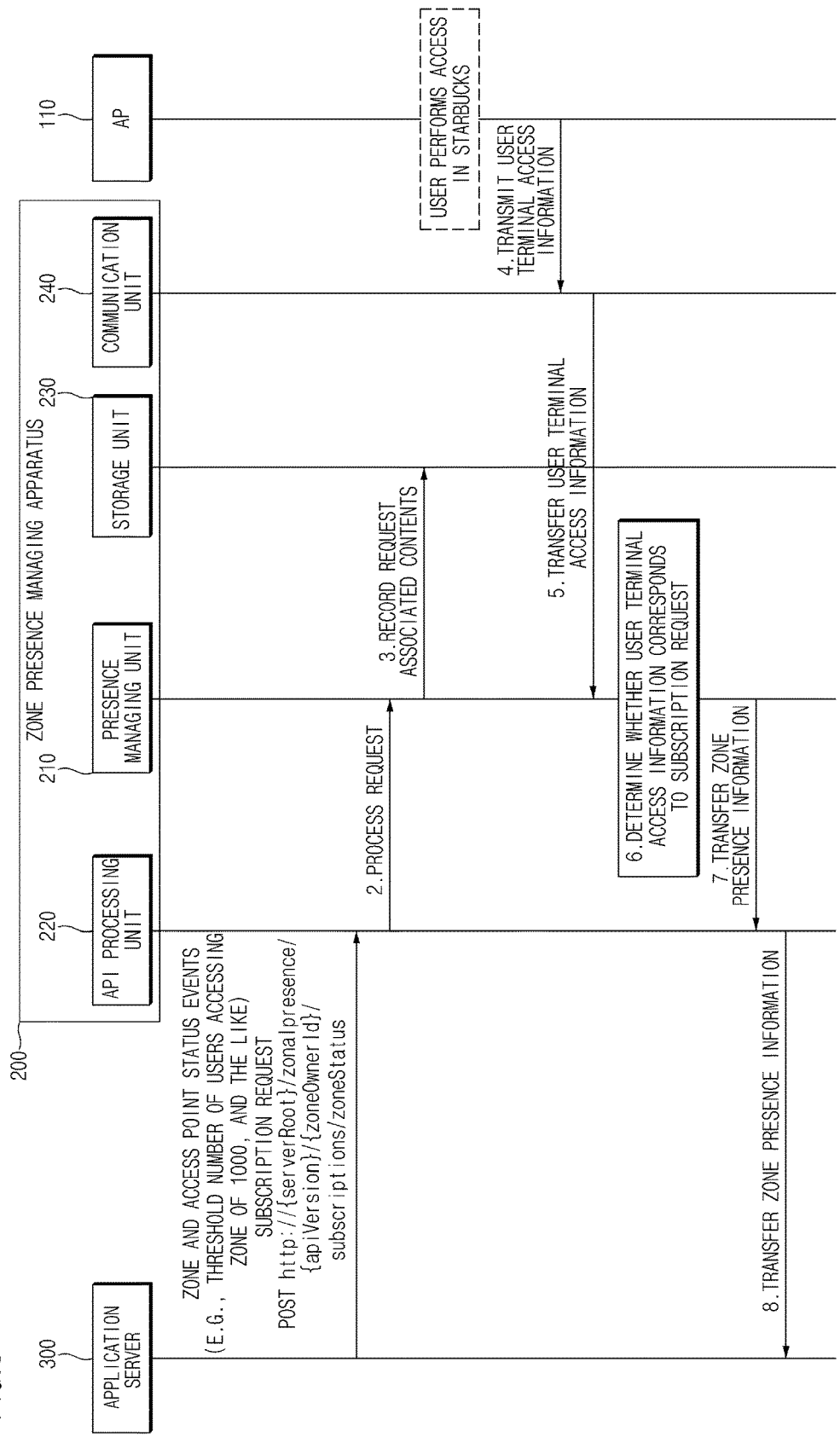

FIGS. 6 to 8 illustrate the method for managing the zone presence according to the exemplary embodiment of the present invention in more detail. FIGS. 9 to 14 are diagrams for describing the zone presence information database according to the exemplary embodiment of the present invention.

First, referring to FIG. 6, a case where the subscription request of requesting user terminal access information (e.g., Zone Enter, Zone Exit, and Zone Transfer) in the interest area (e.g., Gangnam in Seoul) in the zone for any user and notification corresponding thereto are performed is illustrated.

First, the subscription request for the user terminal access information in the interested area is transferred to the API processing unit 220 of the zone presence managing apparatus 200 from the application server 300. For example, the application server 300 receives the subscription request using a POST method of a defined resource from the application and may transfer the subscription request to the API processing unit 220.

Hereinafter, the defined resource will be described with reference to Tables 1 to 3.

TABLE 1

| Resource | URL Base URL: http://{serverRoot}/ zonalpresence/{apiVersion}/{zoneOwnerId} | Data Structure | HTTP verbs | | | |
|---|---|---|---|---|---|---|
| | | | GET | PUT | POST | DELETE |
| Zonelist | /zones | ZoneList | retrieve list of zones | no | no | no |
| Individual zone information | /zones/{zoneId} | ZoneInfo | retrieve individual zone information | no | no | no |
| Access point list | /zones/{zoneId}/accessPoints | AccessPointList | retrieve list of access points | no | no | no |
| Individual access point information | /zones/{zoneId}/accessPoints/{accessPointId} | AccessPointInfo | retrieve list of access points access point information | no | no | no |
| Userlist | /users | UserList | retrieve list of users Note: query strings are used to filter the response from the server, for example to include the list of users in a given zone or access point | no | no | no |
| Individual user information | /users/{userId} | UserInfo | retrieve individual user information | no | no | no |

TABLE 2

| Resource | URL Base URL: http://{serverRoot}/ zonalpresence/{apiVersion}/ {zoneOwnerId}/subscriptions | Data Structures | HTTP verbs | | | |
|---|---|---|---|---|---|---|
| | | | GET | PUT | POST | DELETE |
| Zonal traffic change notification subscriptions | /zonalTraffic | NotificationSubscriptionList (used for Get) ZonalTrafficSubscription (used for POST) common: ResourceReference (optional alternative for POST response) | return all subscriptions | no | create new subscription | no |
| Individual zonal traffic change notification subscription | /zonalTraffic /{subscriptionId} | ZonalTrafficSubscription (used for GET and PUT) | return one subscription | update subscription | no | delete one subscription |
| User tracking change notification subscriptions | /userTracking | NotificationSubscriptionList (used for GET) UserTrackingSubscription (used for POST) common: ResourceReference (optional alternative for POST response) | return all subscriptions | no | create new subscription | no |
| Individual user tracking change notification subscription | /userTracking /{subscriptionId} | UserTrackingSubscription (used for GET and PUT) | return one subscription | update subscription | no | delete one subscription |
| Zone status change notification subscriptions | /zoneStatus | NotificationSubscriptionList (used for Get) ZoneStatusSubscription (used for POST) common: ResourceReference (optional alternative for POST response) | return all subscriptions | no | create new subscription | no |
| Individual zone status change notification subscription | /zoneStatus /{subscriptionId} | ZoneStatusSubscription (used for GET and PUT) | return one subscription | update subscription | no | delete one subscription |

TABLE 3

| Resource | URL | Data Structure | HTTP verbs | | | |
|---|---|---|---|---|---|---|
| | | | GET | PUT | POST | DELETE |
| Client notification about zonal presence changes | {provided by client} | ZonalPresenceNotification ZoneStatusNotification | no | no | notification on zonal presence change | no |

Referring to Tables 1 to 3, the defined resource includes a zone list, individual zone information inquiry, an access point list search, individual access point information inquiry, user list search, individual user information inquiry, zonal traffic change notification subscriptions, individual zonal traffic change notification subscription, user tracking change notification subscriptions, individual user tracking change notification subscription, zone status change notification subscriptions, individual zone status change notification subscription, and subscription requests of requesting notification to the application server 300 with respect to zonal presence changes, such as client notification about zonal presence changes, and a URL corresponding to each resource is illustrated. All the resources may be accessed by using GET (READ), PUT (UPDATE), POST (CREATE), and DELETE as basic methods of the HTTP.

For example, the zonal traffic change notification subscriptions and/or the individual zone tracking change notification subscription may correspond to the subscription request including the interested area information. The user tracking change notification subscription and the individual user tracking change notification subscription may correspond to the subscription request including the interested user information. The zone status change notification subscriptions and the individual zone status change notification subscription may correspond to the subscription request including the interested event information.

The zone list search resource requests the zone list search which belongs to a zone owner by using the GET method. A data structure for the zone list resource is ZoneList illustrated in the following Table 4.

TABLE 4

| Element | Type | Optional | Description |
|---|---|---|---|
| zone | ZoneInfo [0 . . . unbounded] | Yes | Collection of the zone information list. |
| resourceURL | xsd:anyURI | No | Self referring URL. |

Referring to Table 4, the ZoneList data structure is a type including the zone list and included in a response body. A resourceURL element means Request URL. Optional means whether the corresponding parameter is included in the response body, Yes means that the corresponding parameter may not be included, and No may mean that the corresponding parameter is necessarily included.

The individual zone information inquiry resource requests inquiry of any zone information of the zone owner by using the GET method. A data structure for the individual zone information resource is ZoneInfo illustrated in the following Table 5.

TABLE 5

| Element | Type | Optional | Description |
|---|---|---|---|
| zoneId | xsd:string | No | Identifier of zone (e.g. zone001). |
| numberOfAccessPoints | xsd:unsignedInt | No | Number of access points within the zone. |
| numberOfUnserviceableAccessPoints | xsd:unsignedInt | No | Number of inoperable access points within the zone. |
| numberOfUsers | xsd:unsignedInt | No | Number of users currently on the zone. |
| resourceURL | xsd:anyURI | No | Self referring URL |

Referring to Table 5, the ZoneInfo data structure is a type including the zone information and included in a response body. numberOfAccessPoints may mean the number of wireless access points in the zone, numberOfUnserviceableAccessPoints may mean the number of wireless access points which are not operable in the zone, and numberOfUsers may mean the number of users (that is, the number of user terminals) in the zone.

The access point list search resource requests the access point list search of the zone owner by using the GET method. A data structure for the wireless access point list resource is AccessPointList illustrated in the following Table 6.

TABLE 6

| Element | Type | Optional | Description |
|---|---|---|---|
| zoneId | xsd:string | No | Identifier of zone (e.g. zone001). |
| accessPoint | AccessPointInfo [0 . . . unbounded] | Yes | Collection of the access point Information list. |
| resourceURL | xsd:anyURI | No | Self referring URL. |

Referring to Table 6, the AccessPointList data structure is a type including the access point list and included in a response body.

The individual access point information inquiry resource requests any access point information inquiry of the zone owner by using the GET method. A data structure for the individual access point information resource is AccessPointInfo illustrated in the following Table 7.

TABLE 7

| Element | Type | Optional | Description |
|---|---|---|---|
| accessPointId | xsd:string | No | Identifier of access point (e.g. ap01). |
| locationInfo | LocationInfo | Yes | The coordinates of the access point. |
| connectionType | ConnectionType | No | Connection type of access point. |
| operationStatus | OperationStatus | No | Operation status of access point |
| numberOfUsers | xsd:unsignedInt | No | Number of users currently on the access point. |
| timezone | xsd:dateTimeStamp | Yes | Time zone of access point |
| interestRealm | xsd:string | Yes | Interest realm of access point (e.g. geographical area, a type of industry etc.). |
| resourceURL | xsd:anyURI | No | Self referring URL. |

Referring to Table 7, the AccessPointInfo data structure is a type including the access point information and included in a response body. locationInfo may mean a coordinate where the access point is positioned, connectionType may mean an access point connection type, operationStatus may mean an operation status of the access point, numberOfUsers may mean the number of user terminals accessing the access point, timezone may mean a time zone of the access point, and interestRealm may mean an interested area.

Meanwhile, locationInfo may be defined as the following Table 8 and may include location information having latitude, longitude, altitude, and accuracy.

TABLE 8

| Element | Type | Optional | Description |
|---|---|---|---|
| latitude | xsd:float | No | Location latitude. |
| longitude | xsd:float | No | Location longitude. |
| altitude | xsd:float | Yes | Location altitude. |
| accuracy | xsd:unsignedInt | No | Accuracy of location provided in meters. |

The user list searchresource researches the user list of the zone owner by using the GET method. A data structure for the user list resource is UserList illustrated in the following Table 9.

TABLE 9

| Element | Type | Optional | Description |
|---|---|---|---|
| user | UserInfo [0 . . . unbounded] | Yes | Collection of the user information list. |
| resourceURL | xsd:anyURI | No | Self referring URL. |

Referring to Table 9, the UserList data structure is a type including the user list and included in a response body.

The individual user information inquiry resource inquires any user information of the zone owner by using the GET method. A data structure for the individual user information resource is UserInfo illustrated in the following Table 10.

TABLE 10

| Element | Type | Optional | Description |
|---|---|---|---|
| address | xsd:anyURI | No | Address of user (e.g. 'sip' URI, 'tel' 'acr' URI) currently on the access point. |
| accessPointId | xsd:string | No | Identifier of access point (e.g. ap01). |
| zoneId | xsd:string | No | Identifier of zone (e.g. zone001). |
| resourceURL | xsd:anyURI | No | Self referring URL. |

Referring to Table 10, the UserInfo data structure is a type including the user information and included in a response body. Address may mean an ID of the user.

The zonal traffic change notification subscriptions resource inquires all of the zonal traffic change notification subscriptions by using the GET method and requests a new subscription for the zonal traffic change notification by using the POST method. The data structure for the GET method is NotificationSubscriptionList illustrated in the following Table 11 and the data structure for the POST method is ZonalTrafficSubscription illustrated in the following Table 12.

TABLE 11

| Element | Type | Optional | Description |
|---|---|---|---|
| zonalTrafficSubscription | ZonalTrafficSubscription [0 . . . unbounded] | Yes | Collection of ZonalTrafficSubscription elements. |
| userTrackingSubscription | UserTrackingSubscription [0 . . . unbounded] | Yes | Collection of UserTrackingSubscription elements. |
| zoneStatusSubscription | ZoneStatusSubscription [0 . . . unbounded] | Yes | Collection of ZoneStatusSubscription elements. |
| resourceURL | xsd:anyURI | No | Self referring URL. |

TABLE 12

| Element | Type | Optional | Description |
|---|---|---|---|
| clientCorrelator | xsd:string | Yes | A correlator that the client can use to tag this particular resource representation during a request to create a resource on the server. This element MAY be present. Note: this allows the client to recover from communication |

TABLE 12-continued

| Element | Type | Optional | Description |
|---|---|---|---|
| | | | failures during resource creation and therefore avoids duplicate subscription creation in such situations. In case the element is present, the server SHALL not alter its value, and SHALL provide it as part of the representation of this resource. In case the element is not present, the server SHALL NOT generate it |
| callbackReference | common:CallbackReference | No | Notification callback definition. |
| zoneId | xsd:string | No | Identifier of zone (e.g. zone001) to monitor. |
| interestRealm | xsd:string [0 . . . unbounded] | Yes | Interest realms of access points within a zone (e.g. geographical area, a type of industry etc.). |
| userEventCriteria | UserEventType [0 . . . unbounded] | Yes | List of user event values to generate notifications for (these apply to zone identifier or all interest realms within zone identifier specified). If this element is missing, a notification is requested to be generated for any change in user event. |
| duration | xsd:unsignedInt | Yes | Period (in seconds) of time notifications are provided for. If set to "0" (zero), a default duration time, which is specified by the service policy, will be used. If the parameter is omitted, the notifications will continue until the maximum duration time, which is specified by the service policy, unless the notifications are stopped by deletion of subscription for notifications. This element MAY be given by the client during resource creation in order to signal the desired lifetime of the subscription. The server MUST return in this element the period of time for which the subscription will still be valid. |
| resourceURL | xsd:anyURI | Yes | Self referring URL. The resourceURL SHALL NOT be included in POST requests by the client, but MUST be included in POST requests representing notifications by the server to the client, when a complete representation of the resource is embedded in the notification. The resourceURL MUST also be included in responses to any HTTP method that returns an entity body, and in PUT requests. |

Referring to Table 12, a ZonalTrafficSubscription data structure is a type including the zonal traffic subscription and included in the request body and the response body. When the event suitable for the condition after the subscription occurs, the event needs to be notified to the application server 300 (that is, the application), and callbackReference means an event reception address of the application server (that is, the application) for the event. InterestRealm is used for subscribing only the event occurring in the specific interested area in the zone, userEventCriteria is used for filtering the event occurring in the zone, and duration means a time required up to the notification after the subscription request.

The individual zonal traffic change notification subscription resource inquires and requests the individual zonal traffic change notification subscription by using the GET method, updates the individual zonal traffic change notification subscription by using the PUT method, and deletes the zonal traffic change notification subscription by using the DELETE method. The data structure for the GET method and the PUT method is ZonalTrafficSubscription illustrated in Table 12.

The user tracking change notification subscriptions resource inquires all of the user tracking change notification subscriptions by using the GET method and generates a new subscription for the user tracking change notification by using the POST method. The data structure for the GET method is NotificationSubscriptionList illustrated in the following Table 11 and the data structure for the POST method is UserTrackingSubscription illustrated in the following Table 13.

TABLE 13

| Element | Type | Optional | Description |
| --- | --- | --- | --- |
| clientCorrelator | xsd:string | Yes | A correlator that the client can use to tag this particular resource representation during a request to create a resource on the server. This element MAY be present. Note: this allows the client to recover from communication failures during resource creation and therefore avoids duplicate subscription creation in such situations. In case the element is present, the server SHALL not alter its value, and SHALL provide it as part of the representation of this resource. In case the element is not present, the server SHALL NOT generate it. |
| callbackReference | common:CallbackReference | No | Notification callback definition. |
| address | xsd:anyURI | No | Address of user (e.g. 'sip' URI, 'tel' URI, 'acr' URI) to monitor. |
| userEventCritetia | UserEventType [0 . . . unbounded] | Yes | List of user event values to generate notifications for (these apply to address specified). If this element is missing, a notification is requested to be generated for any change in user event. |
| resourceURL | xsd:anyURI | Yes | Self referring URL. The resourceURL SHALL NOT be included in POST requests by the client, but MUST be included in POST requests representing notifications by the server to the client, when a complete representation of the resource is embedded in the notification. The resourceURL MUST also be included in responses to any HTTP method that returns an entity body, and in PUT requests. |

Referring to Table 13, a UserTrackingSubscription data structure is a type including the tracking subscription request for the specific user and included in the request body and the response body.

The individual user tracking change notification subscription resource inquires and requests the individual user tracking change notification subscription by using the GET method, updates the individual user tracking change notification subscription by using the PUT method, and deletes the user tracking change notification subscription by using the DELETE method. The data structure for the GET method and the PUT method is UserTrackingSubscription illustrated in Table 13.

The zone status change notification subscriptions resource inquires all of the zone status change notification subscriptions by using the GET method and generates a new subscription request for the zone status change notification by using the POST method. The data structure for the GET method is NotificationSubscriptionList illustrated in the following Table 11 and the data structure for the POST method is ZoneStatusSubscription illustrated in the following Table 14.

TABLE 14

| Element | Type | Optional | Description |
| --- | --- | --- | --- |
| clientCorrelator | xsd:string | Yes | A correlator that the client can use to tag this particular resource representation during a request to create a resource on the server. This element MAY be present. Note: this allows the client to recover from communication failures during resource creation and therefore avoids duplicate subscription creation in such situations. In case the element is present, the server SHALL not alter its value, and SHALL provide it as part of the representation of this resource. In |

TABLE 14-continued

| Element | Type | Optional | Description |
|---|---|---|---|
| | | | case the element is not present, the server SHALL NOT generate it. |
| callbackReference | common:CallbackReference | No | Notification callback definition. |
| zoneId | xsd:string | No | Identifier of zone (e.g. zone001) to monitor. |
| numberOfUsersZoneThreshold | xsd:unsignedInt | Yes | Threshold number of users in a zone which if crossed shall cause a notification. |
| numberOfUsersAPThreshold | xsd:unsignedInt | Yes | Threshold number of users in an access point which if crossed shall cause a notification. |
| operationStatus | OperationStatus [0 . . . unbounded] | Yes | List of operation status values to generate notifications for (these apply to all access points within a zone). |
| resourceURL | xsd:anyURI | Yes | Self referring URL. The resourceURL SHALL NOT be included in POST requests by the client, but MUST be included in POST requests representing notifications by the server to the client, when a complete representation of the resource is embedded in the notification. The resourceURL MUST also be included in responses to any HTTP method that returns an entity body, and in PUT requests. |

Referring to Table 14, a ZoneStatusSubscription data structure is a type including the zone status subscription and included in the request body and the response body. NumberOfUsersZoneThreshold is a maximum threshold value of the number of users accessing the zone and numberOfUsersAPThreshold means a maximum threshold value of the number of users accessing the wireless access point. When the user (that is, the user terminal) accesses the zone beyond the corresponding threshold value, the threshold value is notified to the application server (that is, the application) as the presence information. OperationStatus means an operation status of the wireless access point.

The individual zone status change notification subscription resource inquires the individual zone status change notification subscription by using the GET method, updates the individual zone status change notification subscription by using the PUT method, and deletes the zone status change notification subscription by using the DELETE method. The data structure for the GET method and the PUT method is ZoneStatusSubscription illustrated in Table 14.

The client notification about zonal presence changes resource notifies the zonal presence changes to the application server 300 (that is, the application) by using the POST method. The data structure for the POST method is ZonalPresenceNotification illustrated in the following Table 15 and ZoneStatusNotification illustrated in the following Table 16.

TABLE 15

| Element | Type | Optional | Description |
|---|---|---|---|
| callbackData | xsd:string | Yes | CallbackData if passed by the application during the associated ZonalTrafficSubscription and UserTrackingSubscription operation. See [REST_NetAPI_Common]. |
| zoneId | xsd:string | No | Identifier of zone (e.g. zone001). |
| address | xsd:anyURI | No | Address of user (e.g. 'sip' URI, 'tel' URI, 'acr' URI). |
| interestRealm | xsd:string | Yes | Interest realm of access point (e.g. geographical area, a type of industry etc.). |
| userEventType | UserEventType | No | User event (e.g. Zone Enter, Zone Exit, Zone Transfer) |
| currentAccessPointId | xsd:string | No | Identifier of access point. |
| previousAccessPointId | xsd:string | Yes | Identifier of access point. Note: This element MUST only be present if event type is Zone Transfer. |
| timestamp | xsd:dateTimeStamp | No | Indicates the time of day for zonal presence notification. |

TABLE 15-continued

| Element | Type | Optional | Description |
|---------|------|----------|-------------|
| link | common:Link [0 . . . unbounded] | Yes | Link to other resources that are in relationship with this notification. The server SHOULD include a link to the related subscription. No other links are required or suggested by this specification. |

Referring to Table 15, the ZonalPresenceNotification data structure is a type including the zonal traffic notification and the user tracking notification and included in the request body. CurrentAccessPointId is an access point which accessed or access-released by the user and previousAccessPointId means an access point before moving when the event type is Zone Transfer. Timestamp is a notification time and link includes Request URL and the like.

TABLE 16

| Element | Type | Optional | Description |
|---------|------|----------|-------------|
| callbackData | xsd:string | Yes | CallbackData If passed by the application during the associated ZoneStatusSubscription operation. See [REST_NetAPI_Common]. |
| zoneId | xsd:string | No | Identifier of zone (e.g. zone001). |
| accessPointId | xsd:string | Yes | Identifier of an access point (e.g. ap01). Must be included when numberOfUsersInAP or operationStatus element is included. |
| numberOfUsersInZone | xsd:unsignedInt | Yes | This element shall be present when ZoneStatusSubscription includes numberOfUsersZoneThreshold element and the number of users in a zone exceeds the threshhold defined in this subscription. |
| numberOfUsersInAP | xsd:unsignedInt | Yes | This element shall be present when ZoneStatusSubscripton includes numbeOfUsersAPThreshold element and the number of users in an access point exceeds the threshold defines in the subscription. |
| operationStatus | OperationStatus | Yes | This element shall be present when ZoneStatusSubscription includes operationStatus element and the operation status value of an access point meets Serviceable or Unserviceable or Unknown defined in the subscription. |
| timestamp | xsd:dateTimeStamp | No | Indicates the time of day for zone status notification. |
| link | common:Link [0 . . . unbounded] | Yes | Link to other resources that are in relationship with this notification. The server SHOULD include a link to the related subscription. No other links are required or suggested by this specification. |

Referring to Table 16, the ZoneStatusNotification data structure is a type including the zone status notification and included in a response body. NumberOfUsersInZone is the number of users accessing the zone, and numberOfUsersInAP means the number of users accessing the wireless access point.

Meanwhile, ConnectionType Enumeration defining the connection type of the wireless access point may be defined as the following Table 17.

TABLE 17

| Enumeration | Description |
|-------------|-------------|
| Femto | Access point provides a Femto connection. |
| LTE-femto | Access point provides a LTE-Femto connection. |
| Smallcell | Access point provides a Smallcell connection. |
| LTE-smallcell | Access point provides a LTE-smallcell connection. |

TABLE 17-continued

| Enumeration | Description |
|-------------|-------------|
| Wifi | Access point provides a Wifi connection. |
| Pico | Access point provides a Pico connection. |
| Micro | Access point provides a Micro connection. |
| Macro | Access point provides a Macro connection. |
| Wimax | Access point provides a Wimax connection |
| Unknown | Access point connection type is unknown |

In addition, OperationStatus Enumeration defining the operation status of the wireless access point may be defined as the following Table 18.

TABLE 18

| Enumeration | Description |
| --- | --- |
| Serviceable | Access point is in service |
| Unserviceable | Access point is out of service |
| Unknown | Access point status is unknown |

Referring to Table 18, Serviceable means an operable status of the wireless access point, Unserviceable means an inoperable status of the wireless access point, and Unknown means an unknown status of the wireless access point.

In addition, UserEventType Enumeration defining the event type of the user may be defined as the following Table 19.

TABLE 19

| Enumeration | Description |
| --- | --- |
| Entering | When a mobile device transitions to the coverage of an access point within the zone from one that is external to the zone |
| Leaving | When a mobile device transitions to the coverage of an access point external to the zone from one that is within the zone |
| Transferring | Upon transitioning between two access points within the zone |

Referring to Table 19, UserEventType Enumeration defines the event type of the user. Entering means that any user enters the specific zone, Leaving means that the user leaves from the zone, and Transferring means that the user moves to another place in the zone.

Referring back to FIG. 6, the API processing unit 220 transfers the subscription request to the presence managing unit 220. The presence managing unit 220 records information (for example, the interested area information and the like) included in the subscription request in the zone presence database of the storage unit 230. The zone presence database will be described in more detail with reference to FIGS. 9 to 14.

Referring to FIGS. 9 to 14, the zone presence information database is illustrated. The zone presence information database may include a zone owner information table (see FIG. 9), a zone subscription information table (see FIG. 10), a user subscription information table (see FIG. 11), a zone status information table (see FIG. 12), a zone configuration information table (see FIG. 13), and a zone event information table (see FIG. 14).

The zone owner information table (see FIG. 9) as a table storing owner information of a zone may include ownerId identifying the zone owner, name representing a name of the zone owner, password representing password information of the zone owner, contact representing contact information of the zone owner, and a description column which may store other information. Herein, the zone owner may be an actual owner (that is, an owner of a plurality of wireless access points included in the zone) of the zone.

The zone subscription information table (see FIG. 10) is a table showing to which zone the zone owner requests the subscription. subscriptionId is an identifier that identifies a subscription configuration relationship of the zone owner and the zone. ownerId and zoneId are used for managing which zone owner configures the subscription in any zone. interestRealms as a field used for subscribing an event (that is, user terminal access information) which occurs in the interested area may be separated into various interestRealms to be stored. userEventCriteria is used for filtering the event which occurs in the zone. Only an event in which the subscription is intended to be configured among Zone Enter, Zone Exit, and Zone Transfer which are the events that occur in the zone may be separated and stored. For example, as a value of userEventCriteria, Zone Enter and Zone Exit may be stored and userEventCriteria may mean that the subscription is requested only with respect to the events of Zone Enter and Zone Exit.

The user subscription information table (see FIG. 11) may be used for storing the request information, when the zone owner subscription-requests presence information of a specific user. subscriptionId is an identifier for identifying the subscription configuration relationship of the zone owner. ownerId and userId are used to represent the subscription configuration relationship of the zone owner and a user. userEventCriteria is used for filtering the event which occurs in the zone.

The zone status information table (see FIG. 12) is a table for managing a subscription request for status information of the zone. subscriptionId is an identifier for distinguishing individual subscription requests and ownerId is an identifier for storing the zone owner, and zoneId is an identifier for designating a specific zone.

A status of the zone may be expressed as two types of a maximum threshold (noOfZoneUsers) of the number of user terminals that access the zone and a maximum threshold (noOfAPUsers) of the number of user terminals that access the wireless access point. When the number of user terminals that access the zone or the wireless access point is more than the maximum threshold, a specific event occurs and the zone presence managing apparatus 200 may notify the presence information to the application server 300. operationStatus represents an operation status of the wireless access point. For example, operationStatus may represent a failure status of the wireless access point, and the like.

Meanwhile, when an event which meets a condition occurs for each subscription request, the corresponding event needs to be announced to the application server (ultimately, application) and to this end, a receiving address of the application server (alternatively, application) is required. callbackAddress columns of the zone subscription information table, the user subscription information table, and the zone status information table may be used for such a purpose.

The zone configuration information table (see FIG. 13) is a table storing configuration information of the zone. Since the zone is expressed as a set of the wireless access points, the zone configuration information table includes information indicating by which access points each zone is constituted. The zone configuration information table may include zoneId which is an identifier identifying the zone, apId which is an identifier identifying the wireless access point, apStatus representing an operation status of the wireless point, noOfUsers representing the number of user terminals accessing the wireless access point, location representing a geographical coordinate of the wireless access point, connType representing a type of the wireless access point, timezone representing a time zone of the wireless access point, and interestRealms column representing the interested area to which the wireless access point belongs. Location may have forms of latitude, longitude, altitude, and accuracy. Conntype may have values representing the type of wireless access point, such as femto, lte-femto, wifi, small-cell, lte-smallcell, pico, and the like.

The zone event information table (see FIG. 14) may be used for storing a history in which the user terminal accesses the wireless access point. The zone event information table may include zoneId identifying the zone, apId identifying the wireless access point, userId which is a user ID that accesses the wireless access point, connectionTime representing an access time, and releaseTime representing an access release time.

Referring back to FIG. 6, the presence managing unit 210 records contents associated with the subscription request in the storage unit 230 and thereafter, the wireless access point may transfer user terminal access information to the communication unit 240 when the user terminal accesses the interested area (e.g., Seoul Gangnam). The communication unit 240 transfers the user terminal access information to the presence managing unit 210.

The presence managing unit 210 determines whether the user terminal access information corresponds to the subscription request. For example, the presence managing unit 210 may determine whether the user terminal access information corresponds to the subscription request by using the zone presence information database stored in the storage unit 230.

The presence managing unit 210 transfers a user terminal access fact as presence information to the API processing unit 220 when the user terminal access information corresponds to the subscription request. The API processing unit 220 transfers the presence information to the application server 300.

Referring to FIG. 7, a case where the subscription request of requesting the user terminal access information (e.g., Zone Enter, Zone Exit, and Zone Transfer) for tracking a specific interested user and a notification corresponding thereto are performed is illustrated.

First, the subscription request for the user terminal access information in the interested user is transferred to the API processing unit 220 of the zone presence managing apparatus 200 from the application server 300. For example, the application server 300 may receive the subscription request using a POST method of a defined resource from the application and transfer the subscription request to the API processing unit 220.

The API processing unit 220 transfers the subscription request to the presence managing unit 220. The presence managing unit 220 records information (for example, the interested user information, and the like) included in the subscription request in the zone presence database of the storage unit 230.

After a processing procedure of the subscription request is completed, when the wireless access point is accessed by the user terminal of a specific user in the zone (ex. Zone 1), the wireless access point may transfer the user terminal access information to the communication unit 240. The communication unit 240 transfers the user terminal access information to the presence managing unit 210.

The presence managing unit 210 determines whether the user terminal access information corresponds to the subscription request. For example, the presence managing unit 210 may determine whether the user terminal access information corresponds to the subscription request by using the zone presence information database stored in the storage unit 230.

The presence managing unit 210 transfers a user terminal access fact as presence information to the API processing unit 220 when the user terminal access information corresponds to the subscription request. The API processing unit 220 transfers the presence information to the application server 300. Thereafter, when a specific user accesses the wireless access point in another zone (e.g., Zone 2), a procedure for a notification is the same as the above procedure.

Referring to FIG. 8, a case in which a subscription request of requesting status event information (e.g., the threshold number of users accessing the zone and/or wireless access point, the operation status of the wireless access point, and the like) of the zone and/or the wireless access point and a notification corresponding thereto are performed is illustrated.

First, the subscription request for the status event information of the zone and/or the wireless access point is transferred to the API processing unit 220 of the zone presence managing apparatus 200 from the application server 300. For example, the application server 300 may receive the subscription request using a POST method of a defined resource from the application and transfer the subscription request to the API processing unit 220.

The API processing unit 220 transfers the subscription request to the presence managing unit 220. The presence managing unit 220 records information (for example, the interested event information, and the like) included in the subscription request in the zone presence database of the storage unit 230.

After a processing procedure of the subscription request is completed, when the wireless access point is accessed by the user terminal in the zone or the interested area in the zone, the wireless access point may transfer the user terminal access information to the communication unit 240. The communication unit 240 transfers the user terminal access information to the presence managing unit 210.

The presence managing unit 210 determines whether the user terminal access information corresponds to the subscription request. For example, the presence managing unit 210 may determine whether the user terminal access information corresponds to the subscription request by using the zone presence information database stored in the storage unit 230. For example, the presence managing unit 210 may determine whether the user terminal access information corresponds to the subscription request by using the status event information of the zone and/or the wireless access point stored in the zone presence information database.

For example, while the status event information of the zone and/or the wireless access point is set to 1000 persons which is the maximum threshold of the number of access persons in the zone, when the user terminal access information corresponds to a 1000-th person, the presence managing unit 210 may determine that the user terminal access information corresponds to the subscription request.

The presence managing unit 210 transfers a user terminal access fact as presence information to the API processing unit 220 when the user terminal access information corresponds to the subscription request. The API processing unit 220 transfers the presence information to the application server 300.

The above description just illustrates the technical spirit of the present invention and various modifications and transformations can be made by those skilled in the art without departing from an essential characteristic of the present invention.

Therefore, the embodiments disclosed in the present invention are used to not limit but describe the technical spirit of the present invention and the scope of the technical spirit of the present invention is not limited by the embodiments. The scope of the present invention should be interpreted by the appended claims and it should be analyzed that all technical spirit in the equivalent range is intended to be embraced by the present invention.

What is claimed is:

1. An apparatus for managing zone presence, which manages presence information of a zone including a plurality of wireless access points, the apparatus comprising:
an application server configured to receive an application programming interface (API) call request and send a subscription request based on the API call request;
a presence managing unit configured to receive the subscription request from the application server, configured to receive the user terminal access information form at least one of a plurality of wireless access points, and configured to determine whether the user terminal access information received from any one of the plurality of wireless access points corresponds to the subscription request; and
an API processing unit configured to provide the presence information to the application server when the user terminal access information corresponds to the subscription request,
wherein the subscription request includes at least one of interested area information, interested user information, and interested event information, and
wherein the presence managing unit records at least one of the interested area information, the interested user information, and the interested event information in a zone presence information database and determines whether the user terminal access information corresponds to the subscription request by using the zone presence information database.

2. The apparatus of claim 1, wherein the subscription request is a request for access information of a user terminal which accesses the wireless access point included in an interested area defined as a specific area in the zone.

3. The apparatus of claim 1, wherein the subscription request is a request for access information of a user terminal of a specific user to the plurality of wireless access points.

4. The apparatus of claim 1, wherein the subscription request is a request for information on a specific event which occurs in at least one of the plurality of wireless access points.

5. The apparatus of claim 1, wherein the zone presence information database includes at least one of a zone owner information table, a zone subscription information table, a user subscription information table, a zone status information table, a zone configuration information table, and a zone event information table.

6. The apparatus of claim 5, wherein the user subscription information table includes the interested user information.

7. The apparatus of claim 5, wherein the zone status information table includes the interested event information, and
the interested event information includes a maximum threshold of the number of user terminals that access the plurality of wireless access points included in the zone.

8. The apparatus of claim 5, wherein the zone configuration information table includes the interested area information, and
the interested area information is defined as information on a specific area in the zone.

9. The apparatus of claim 5, wherein the zone event information table includes at least one of zone identification information, access start time information, access end time information, access point (AP) identification information, and terminal identification information.

10. The apparatus of claim 1, wherein the API processing unit provides the presence information to the application server by using a service and an application according to a REST architecture style (RESTful) type zone presence API.

11. The apparatus of claim 1, further comprising:
a communication unit receiving the user terminal access information from at least one of the plurality of wireless access points; and
a storage unit storing information included in the subscription request.

12. A method for managing zone presence, which manages presence information of a zone including a plurality of wireless access points, the method comprising:
receiving, with an application server, an application programming interface (API) call request and sending a subscription request based on the API call request;
receiving, with a presence managing unit, the subscription request from the application server;
determining, with a presence managing unit, whether user terminal access information received from any one of the plurality of wireless access points corresponds to the subscription request; and
providing, with an API processing unit, the presence information to the application server when the user terminal access information corresponds to the subscription request,
wherein the subscription request includes at least one of interested area information, interested user information, and interested event information, and
wherein the presence managing unit records at least one of the interested area information, the interested user information, and the interested event information in a zone presence information database and determines whether the user terminal access information corresponds to the subscription request by using the zone presence information database.

13. The method of claim 12, wherein the subscription request is a request for access information of a user terminal which accesses the wireless access point included in an interested area defined as a specific area in the zone.

14. The method of claim 12, wherein the subscription request is a request for access information of a user terminal of a specific user to the plurality of wireless access points.

15. The method of claim 12, wherein the subscription request is a request for information on a specific event which occurs in at least one of the plurality of wireless access points.

* * * * *